Oct. 17, 1950     H. E. CHRISTMAN     2,525,866
AIR CIRCULATION CONTROL FOR REFRIGERATOR TRUCKS
Filed May 6, 1949
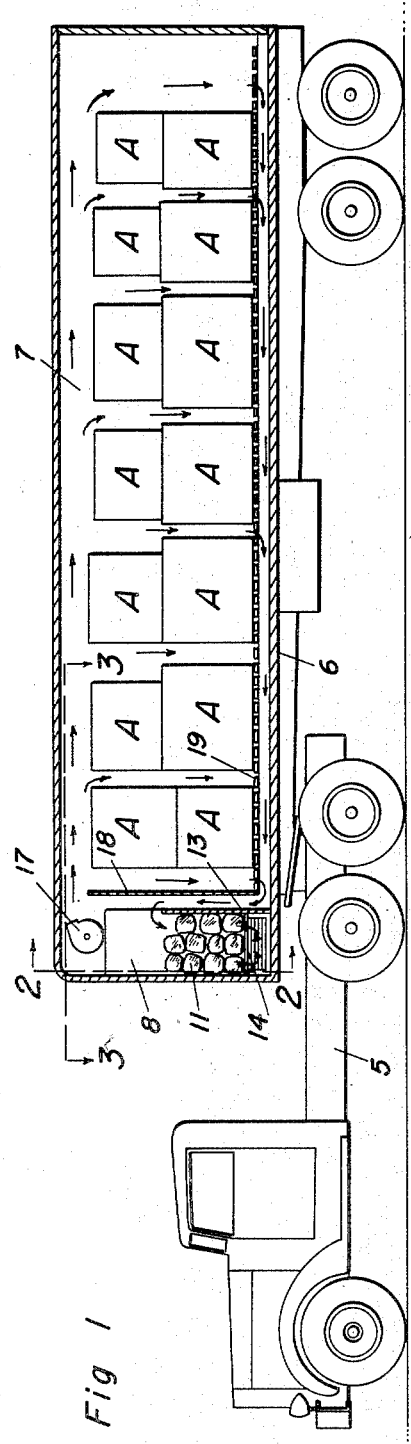
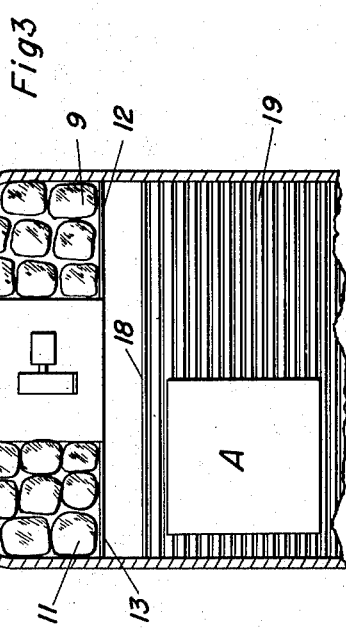
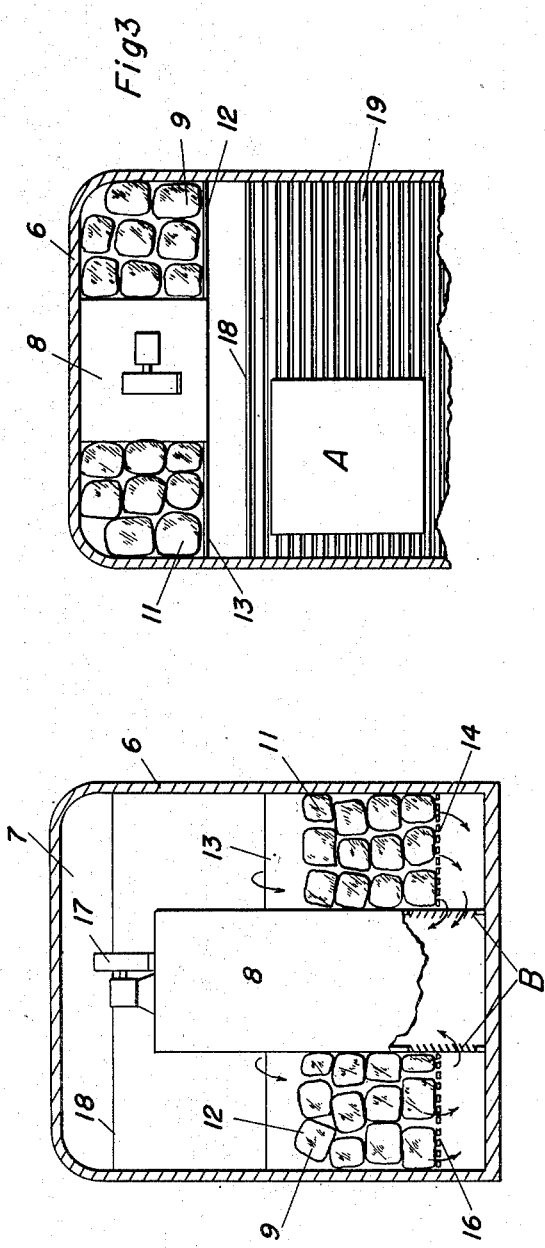
INVENTOR.
Harold E. Christman
BY
Att'y Patented Oct. 17, 1950

2,525,866

UNITED STATES PATENT OFFICE 2,525,866

AIR CIRCULATION CONTROL FOR REFRIGERATOR TRUCKS

Harold E. Christman, San Jose, Calif.

Application May 6, 1949, Serial No. 91,694

3 Claims. (Cl. 62—130)

This invention relates to improvements in air circulation control for refrigerator trucks.

The principal object of this invention is to provide means for the use of a wet and a dry refrigerant for cooling the interiors of trucks or other refrigerating areas.

A further object of this invention is to provide means for controlling the circulation of air through the truck over and through the wet refrigerant, thence through the dry refrigerant and into the refrigerating space, so as to complete the circuit of air movement and, at the same time, to prevent any back drafts from occurring should the forced circulation normally employed cease to function.

A further object is to provide control means which are automatic in operation, simple to install and which occupy a minimum amount of space in the truck.

A still further object is to provide a construction which may be employed with the ordinary refrigeration equipment now in use in many refrigerating trucks.

Other objects and advantages will be apparent during the course of the following description.

In the accompanying drawings forming a part of this specification and in which like numerals are employed to designate like parts throughout the same, Fig. 1 is a side elevation of a truck and trailer having my invention applied thereto, a portion of the trailer being shown in cross section, Fig. 2 is an enlarged detail cross-sectional view, taken on the line 2—2 of Fig. 1 and looking in the direction of the arrows, and Fig. 3 is an enlarged fragmentary detail cross-sectional view, taken on the line 3—3 of Fig. 1.

In the shipping of commodities, it is often necessary to provide refrigeration means in order that the product being shipped will not spoil in transit. Many types of refrigerants are used, such as dry ice, block ice, or crushed ice. The dry ice is often objectionable in that it produces too low a temperature and will absorb and freeze much of the moisture in the refrigeration area, thus dehydrating the products being transported. Wet ice, such as frozen water, often provides too much moisture and causes spoilage, particularly mildewing. Further, crushed ice has to be replaced very often, due to its rapid melting.

Applicant has found that a combination of dry ice and wet ice, together with forced circulation, results in an ideal condition and that, by controlling the circulation of air through the refrigerant, it enables the operator to maintain any desired temperature in the refrigerated area, regardless of normal outside temperatures; and that, by providing draft-controlling bulkheads, reverse circulation of air is prevented. When reverse circulation does take place, as has been common heretofore, a freezing of the commodity adjacent the refrigerant takes place, due to the natural dropping of cold air.

Referring to the accompanying drawings wherein, for the purpose of illustration, is shown a preferred embodiment of my invention, the numeral 5 designates an ordinary tractor to which is attached a trailer 6. This trailer has an interior space 7, in which commodities are being transported.

My invention consists in positioning in the forward end of the trailer a refrigerating unit 8, such as described in my co-pending application, Serial No. 745,917, filed May 5, 1947.

On each side of this unit I form ice compartments 9 and 11 through the use of bulkheads 12 and 13 respectively, which extend from the floor level of the truck, substantially half-way toward the top of the truck. Within these ice compartments I place slatted grills, as shown at 14 and 16, the purpose of which will be later seen.

Mounted upon the top of the unit 8, is a blower 17, for the purpose of circulating the air within the truck.

It will be noted that, spaced from the unit 8 and the bulkheads 12 and 13, is a bulkhead 18, which extends from the slatted floor 19 in the truck, to a point spaced slightly from the top of the truck, which point is above the top of the commodities being carried in the truck. This provides for air to blow across the entire top of the truck from the front end to the back end and to pass downwardly between the crates or other goods being carried, and then to re-circulate beneath the slatted bottom.

The result of this construction is that, when my truck is loaded with commodities as designated by the letter A, air, circulated by the fan 17, will cause a circulation along the top of the truck and downwardly between the stacked commodities, thence through the slatted floor, passing underneath the bottom of the bulkhead 18, thence upwardly over the bulkheads 12 and 13, thence downwardly through the wet ice in the ice compartments 9 and 11, thence downwardly through the slatted bottom and upwardly through the louvres B, formed in the bottom of the unit 8, to be re-circulated by the fan 17.

The suction of the fan 17 will cause the air to follow the course just enumerated from the bottom of the truck over and through the wet ice and dry ice compartments.

Thermostats or manual control may be employed for turning on and off the fan 17 so that any desired temperature may be maintained within the trailer.

When the fan 17, ceases to operate, there will be no back drafts caused, for the reason that the bulkheads 12 and 13, will trap the cold air being given off by the wet and dry ice, as the cold air cannot rise and pass over these bulkheads 12 and 13 and, therefore, cannot escape over the bulkheads 12 and 13, to flow beneath the slatted floor 19. Were it not for these bulkheads 12 and 13, the cold air, sinking, could spread along the bottom of the trailer and could cause a frosting or freezing of all of the commodities adjacent the floor line, with the resultant spoilage.

With my arrangement, the moisture given off by the wet ice will, to a large extent, crystallize on to the sides of the unit 8, thus materially cutting down the moisture content of the air being circulated, so that a damp condition will not exist and yet it will provide enough humidity so as to eliminate the drying out of the commodities, as occurs with the use of dry ice only. This drying out of the commodities results in great loss, particularly in the shrinkage of commodities which are sold by the pound, such as animal carcasses.

It will thus be seen that my air circulation control for refrigerator trucks will perform all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. Air circulating control means for vehicles comprising a cooling compartment positioned in one end of the vehicle, a bulkhead spaced from the end of the vehicle and extending transversely of the side walls at a point in juxtaposition to said cooling compartment, said bulkhead extending from the floor of the vehicle substantially half-way of the vehicle's height, a second bulkhead spaced from said first-mentioned bulkhead, the lower end of said last-mentioned bulkhead being spaced from the floor of the vehicle and extending to a point above the cooling compartment and spaced from the top of the vehicle, and air-circulating means for exhausting air through said cooling compartment and into the storage area of said vehicle, to be circulated downwardly and beneath said last-mentioned bulkhead, thence upwardly between said bulkheads and through said cooling compartment.

2. In combination with a vehicle having an enclosed storage area, of means for supporting a commodity above the floor of said vehicle, a bulkhead extending from said supporting means to a point adjacent and spaced from the top of said vehicle, a second bulkhead spaced from said first-mentioned bulkhead and extending from the floor of said vehicle to a point substantially half-way to the top of said vehicle, and refrigeration means positioned between said last-mentioned bulkhead and the end of said vehicle, means for forcing air through said refrigerating means, said last-mentioned bulkhead preventing the flow of cold air from said refrigerating compartment toward the area beneath said commodity-supporting means when said air circulating means is inoperative.

3. Air circulating control means for enclosed walled vehicles comprising a cooling unit positioned in said vehicle and against one of the walls thereof, a bulkhead extending between one side of said unit and one of the walls of said vehicle, said bulkhead forming a compartment adjacent said unit, said bulkhead extending from the floor of the vehicle substantially half-way of the vehicle height, a second bulkhead spaced from said first-mentioned bulkhead, the lower end of said last-mentioned bulkhead being spaced from the floor of said vehicle and extending to a point above the top level of said cooling unit and spaced from the top of said vehicle, and air-circulating means for forcing air over said bulkheads and through said cooling unit.

HAROLD E. CHRISTMAN.

REFERENCES CITED

The following references are of record in the file of this patent:

UNITED STATES PATENTS

| Number | Name | Date |
|---|---|---|
| 2,165,580 | Scheufler | July 11, 1939 |